US010422308B2

(12) United States Patent
Dumont et al.

(10) Patent No.: US 10,422,308 B2
(45) Date of Patent: Sep. 24, 2019

(54) PRESSURE REGULATING VALVE FOR REGULATING PRESSURE IN A HIGH-PRESSURE FUEL ACCUMULATOR FOR AN INTERNAL COMBUSTION ENGINE (71) Applicant: Robert Bosch GmbH, Stuttgart (DE)

(72) Inventors: Tony Dumont, Caluire (FR); Olivier Charvet, Saint Laurent de Mure (FR); Raphael Combe, Lyons (FR); David Lacroix, Saint-Genis Laval (FR); Sebastien Binsse, Villeurbanne (FR); Jean-Roch Julien, Corbas (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/384,756

(22) PCT Filed: Feb. 13, 2013

(86) PCT No.: PCT/EP2013/052884
§ 371 (c)(1),
(2) Date: Sep. 12, 2014

(87) PCT Pub. No.: WO2013/135450
PCT Pub. Date: Sep. 19, 2013

(65) Prior Publication Data
US 2015/0041692 A1 Feb. 12, 2015

(30) Foreign Application Priority Data

Mar. 15, 2012 (FR) ...................... 12 52350

(51) Int. Cl.
*F16K 31/06* (2006.01)
*F02M 37/00* (2006.01)
(Continued)

(52) U.S. Cl.
CPC .... *F02M 37/0029* (2013.01); *F02M 63/0052* (2013.01); *F02M 63/0235* (2013.01); *F16K 31/0665* (2013.01); *F16K 31/0693* (2013.01)

(58) Field of Classification Search
CPC ............ F16K 31/0662; F16K 31/0665; F16K 31/0686; F16K 31/0693; F16K 31/0696; F02M 37/0029
(Continued)

(56) References Cited

U.S. PATENT DOCUMENTS 5,531,422 A * 7/1996 Ward .................. F16K 31/0693
251/129.07
5,971,356 A * 10/1999 Offenwanger ............ F16K 1/00
137/614.16
(Continued)

FOREIGN PATENT DOCUMENTS

CN 1904345 A 1/2007
DE 102004002964 8/2005
(Continued)

OTHER PUBLICATIONS

International Search Report for Application No. PCT/EP2013/052884 dated Apr. 4, 2014 (English Translation, 2 pages).

*Primary Examiner* — Matthew W Jellett
(74) *Attorney, Agent, or Firm* — Michael Best & Friedrich LLP (57) ABSTRACT

The invention relates to a pressure regulating valve for regulating pressure in a high-pressure fuel accumulator for an internal combustion engine, comprising a valve piston (5) accommodated axially displaceably in a bore (1) in a valve housing (2), acting on a valve closing member (3) in the direction of a valve seat (4), said valve piston being connected at the end thereof facing away from the valve seat (4) to an armature (6) of a magnetic assembly (7) for actuating the pressure regulating valve, wherein the armature (6) is accommodated in an armature chamber (8) and the valve closing member (3) is accommodated in a valve chamber (9). According to the invention, the valve chamber (9) and the armature chamber (8) are hydraulically connected via at least one groove (10) and/or bore (11) formed in the valve housing (2), valve piston (5) and/or in the armature (6), as well as at least one choke point (12).

7 Claims, 10 Drawing Sheets

(51) Int. Cl.
*F02M 63/02* (2006.01)
*F02M 63/00* (2006.01)

(58) Field of Classification Search
USPC .................................................. 251/129.07
See application file for complete search history.

(56) References Cited

U.S. PATENT DOCUMENTS

| | | | | |
|---|---|---|---|---|
| 6,021,997 | A * | 2/2000 | Hell | F15B 13/0403 |
| | | | | 251/129.07 |
| 6,837,478 | B1 * | 1/2005 | Goossens | B60T 8/363 |
| | | | | 251/129.15 |
| 6,869,060 | B2 * | 3/2005 | Barber | F15B 13/0405 |
| | | | | 251/129.15 |
| 7,040,594 | B2 * | 5/2006 | Hironaka | F16K 31/0665 |
| | | | | 251/129.07 |
| 8,113,176 | B2 * | 2/2012 | Rossignol | F02M 47/027 |
| | | | | 123/467 |
| 2008/0099583 | A1 * | 5/2008 | Magel | F02M 51/0603 |
| | | | | 239/533.3 |

FOREIGN PATENT DOCUMENTS

| | | | | |
|---|---|---|---|---|
| EP | 1174615 | A2 | 1/2002 | |
| EP | 1748240 | | 1/2007 | |
| FR | 2899949 | | 10/2007 | |
| JP | H11200977 | A | 7/1999 | |
| JP | 2007040106 | A | 2/2007 | |
| WO | WO 2007119007 | A1 * | 10/2007 | ......... F02M 63/0015 |
| WO | 2012055638 | | 5/2012 | |

* cited by examiner

Fig. 10 ns of the invention.

PRESSURE REGULATING VALVE FOR REGULATING PRESSURE IN A HIGH-PRESSURE FUEL ACCUMULATOR FOR AN INTERNAL COMBUSTION ENGINE

BACKGROUND OF THE INVENTION

The invention concerns a pressure regulating valve for regulating pressure in a high-pressure fuel accumulator for an internal combustion engine.

Such a pressure regulating valve is known for example from publication DE 10 2004 002 964 A1. It comprises a closing member held in a valve chamber and actuatable via a magnetic actuator, which member closes or opens a connection from the high-pressure accumulator into a low-pressure line. Furthermore the valve comprises a spring element arranged such that on stoppage of the internal combustion engine, the connection from the high-pressure accumulator to the low-pressure line is opened. The spring element is firstly supported on an armature plate and secondly on a radial shoulder of a stepped bore formed in a valve housing, which furthermore holds a valve piston connected to the armature plate. When the magnetic actuator is powered, the armature plate and the valve piston are moved in the direction of a valve seat against the spring force of the spring element, wherein the valve piston presses the closing member into the valve seat. In this switch position, the connection of the high-pressure accumulator to the low-pressure line is closed. When the power supply to the magnetic actuator is interrupted, the armature plate and the valve piston are reset via the spring force of the spring element, lifting the closing member away from the valve seat and opening the valve. In this switch position, the connection of the high-pressure accumulator to the low-pressure line is open, wherein fuel flowing out of the high-pressure accumulator via the low-pressure line is supplied to a fuel storage container.

Pressure fluctuations can be transmitted to the pressure regulating valve via the low-pressure line and a low-pressure system connected thereto, which normally comprises a fuel storage container, a pre-delivery pump and the supply region of a high-pressure pump. As a result of these pressure fluctuations, the valve piston of the pressure regulating valve can execute uncontrollable movements and the pressure regulating valve may open unintentionally. This should be avoided since the pressure fall in the high-pressure accumulator, which is caused on opening of the pressure regulating valve, can lead to instabilities and in some cases the pressure can fall below the minimum pressure necessary to start the engine. Furthermore the pressure regulating valve can be excited to natural vibrations via the low-pressure region, which leads to undesirable pressure peaks in the low-pressure system and/or to unpleasant noise development.

SUMMARY OF THE INVENTION

The present invention is therefore based on the object of specifying a pressure regulating valve for regulating pressure in a high-pressure fuel accumulator which allows compensation for such pressure fluctuations or pressure waves and hence guarantees a higher function reliability.

The pressure regulating valve proposed for regulating pressure in a high-pressure accumulator for an internal combustion engine comprises a valve piston held axially displaceably in a bore of a valve housing and acting on a valve closing member in the direction of a valve seat, said valve piston being connected, at its end facing away from the valve seat, to an armature of a magnetic assembly for actuating the pressure regulating valve. The armature here is held in an armature chamber and the valve closing member is held in a valve chamber. According to the invention, the valve chamber and the armature chamber are hydraulically connected via at least one groove and/or bore formed in the valve housing, valve piston and/or armature, and at least one choke point. The hydraulic connection of the valve chamber with the armature chamber causes an increase in any hydraulic volume available to compensate for any pressure fluctuations or waves, wherein due to the interposition of at least one choke point, the sensitivity of the valve is reduced. This is because the choke point prevents the transmission of pressure peaks from the valve chamber to the armature chamber which could lead to an unintentional excitation of the armature and hence the opening of the valve.

Insofar as at least one groove is provided for hydraulic connection of the valve chamber with the armature chamber, this is preferably arranged running substantially axially, on the outer peripheral side, on the valve piston and/or in the wall of the bore in the valve housing receiving the valve piston. The groove, together with the opposite wall face of the bore or outer peripheral face of the valve piston, then forms a channel which guarantees the hydraulic connection. Alternatively or additionally, at least one groove can be formed on the armature. The armature can comprise the groove in the region of its outer peripheral face and/or in the region of its surface facing the valve chamber, wherein then preferably the groove runs substantially radially.

Insofar as at least one bore is provided for hydraulic connection of the valve chamber with the armature chamber, this is preferably provided in the valve piston and/or in the valve housing. Preferably the bore is configured running substantially axially and opens into the valve chamber and/or armature chamber via a transverse bore. Alternatively or additionally, a bore can be provided in the armature. At least one groove and/or bore provided in the armature facilitates the pressure compensation within the armature chamber.

The at least one choke point is preferably formed in the groove and/or bore. For this the cross section of the groove and/or bore can be reduced such that a choke point is formed. Alternatively or additionally, a choke element can be inserted in the groove and/or bore.

According to a preferred embodiment of the invention, the groove and/or bore is formed stepped to form at least one choke point. The necessary cross section reduction to form the choke point is achieved by the step.

According to a further preferred embodiment, at least one choke point is connected upstream of the groove and/or bore. In this case the choke point serves to connect the valve chamber to the groove or bore. If, according to an alternative embodiment, the choke point is connected downstream of the groove or bore, it serves to connect the groove and/or bore with the armature chamber. Both embodiments have the advantage that the proximity to the valve chamber or armature chamber facilitates the configuration of the choke point.

Alternatively or additionally, a guide portion of the bore of the valve housing can form at least one choke point. For this in the region of the guide portion, the play between the valve piston held in the bore and the valve housing can be configured such that the desired choke effect is achieved.

Furthermore preferably it is provided that the valve chamber can be connected to a return directly via at least one radial bore formed in the valve housing. Via the connection to the return, the fuel quantity flowing out from the valve can be supplied to a fuel storage container. The at least one radial bore serves as a valve outlet.

The high flow speed of the fuel, caused by the cross section, in the region of such a radial bore serving as a valve outlet can lead to the creation of the pressure waves and/or a back pressure insofar as the valve output is directly connected to the valve chamber. The back pressure in the valve chamber may cause an additional pressure difference between the pressure in the valve chamber and the pressure in the armature chamber. According to a preferred alternative embodiment of the invention, it is therefore proposed that the valve chamber can be connected to a return indirectly via the armature chamber. The indirect connection via the armature chamber takes place with the interposition of at least one groove and/or bore and at least one choke point, in order to prevent the propagation of pressure waves.

Alternatively or additionally, an additional hydraulic volume can be provided in the form of a blind bore formed in the valve housing. Preferably the blind bore opens into the armature chamber and is consequently hydraulically connected to the valve chamber via the at least one groove and/or bore and the at least one choke point. The additional hydraulic volume serves as a compensation volume and consequently improves the compensation or damping of pressure waves. Furthermore by changing the dead space present in the valve housing, the resonant frequency of the pressure regulating valve can be influenced or matched to the low-pressure circuit such that the risk of natural vibrations is reduced.

Furthermore it is proposed that the armature is formed as a flat armature or solenoid plunger. The proposed concept is thus largely independent of the actual configuration of the magnetic circuit or magnetic assembly for actuating the pressure regulating valve and of the spring position. The pressure regulating valve can consequently be configured as a normally closed or normally open valve.

BRIEF DESCRIPTION OF THE DRAWINGS

Preferred embodiments of the invention are explained in more detail below with reference to the enclosed drawings. These show:

FIG. 2b a derivation of the valve piston shown in FIG. 2a;

DETAILED DESCRIPTION

Figure 1:
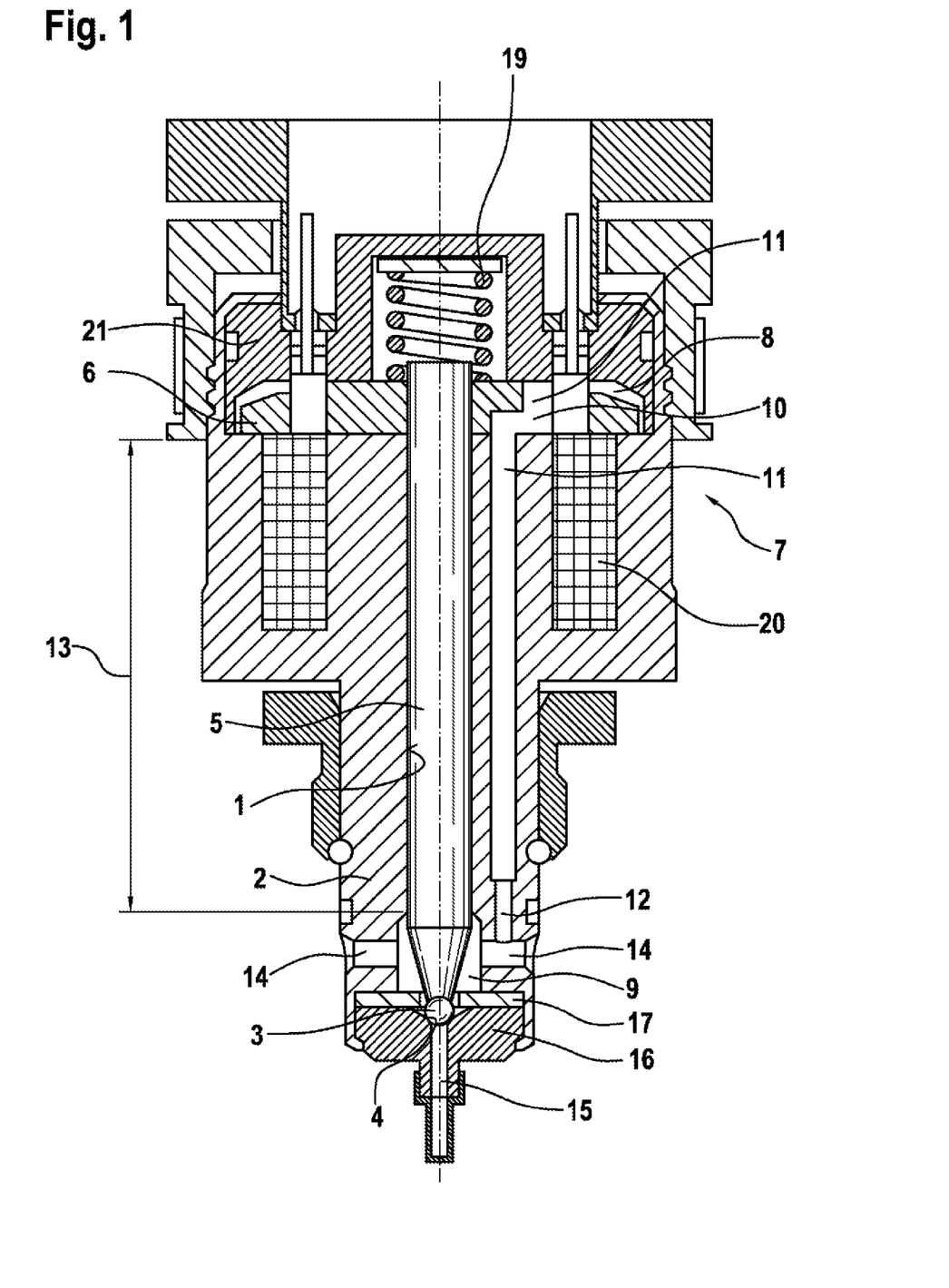
FIG. 1 a diagrammatic longitudinal section through a first preferred embodiment of a pressure regulating valve according to the invention.

The depiction in FIG. 1 shows the structure of a first preferred exemplary embodiment of a pressure regulating valve according to the invention. A bore 1 is formed in a valve housing 2, in which bore a valve piston 5 is guided axially displaceably. The guide portion is marked with reference numeral 13. At a first end, the valve housing 2 has an annular receiving chamber for a magnetic coil 20 of a magnetic assembly 7 configured coaxially to and surrounding the bore 1. Next to the receiving chamber is an armature chamber 8 which holds an armature 6 cooperating with the magnetic coil 20 of the magnetic assembly 7. The armature chamber 8 is surrounded by a pot-like cover part 21 so that furthermore a receiving chamber is created for a spring 19, the spring force of which loads the armature 6 in the direction of a valve seat 4.

In the pressure regulating valve shown, the magnetic force of the magnetic coil 20 acts in the same direction as the spring force of the spring 19, so that using the magnetic coil 20 a further closing force can be achieved. To open the valve, the hydraulic pressure present on the valve inlet side, i.e. the pressure in the high-pressure accumulator, must rise such that it at least overcomes the spring force of the spring 19. The invention furthermore comprises pressure regulating valves in which the magnetic force works against the spring force.

The armature 6 is connected to the valve piston 5 guided axially displaceably in the bore 1 of the valve housing 2 such that the spring force of the spring 19 and the magnetic force of the magnetic coil 20 pressurize the armature 6 and valve piston 5 with a closing force in the direction of the valve seat 4. When the power supply to the magnetic coil 20 is interrupted, a rising pressure in the high-pressure fuel accumulator (not shown) can cause the valve to open. The pressure difference between the inlet-side and outlet-side pressure then causes a valve closing member 3, formed in the present case as a ball, to lift away from the valve seat 4. The valve piston 5 and the armature 6 are then moved in the direction of the cover part 21 against the spring force of the spring 19 by the lift of the valve closing member 3. In this switch position, the pressure regulating valve allows a connection of the high-pressure fuel accumulator to a low-pressure circuit (not shown). Fuel flows out from the high-pressure accumulator via a valve inlet 15 configured as a central bore in a valve piece 16, a valve chamber 9 and at least one radial bore 14 serving as a valve outlet, and in this way causes a pressure drop in the high-pressure accumulator. The valve piece 16 is supported via a spacer 17 on the valve housing 2.

The actual invention is in this case implemented by a bore 11 formed in the valve housing 2 and a choke point 12 which hydraulically connect the valve chamber 9 and armature chamber 8. To form the choke point, the bore 11 is formed as a stepped bore, i.e. it has a reduced flow cross section in the region of the choke point 12. The bore 11 or choke point 12 opens into the radial bore 14 serving as a valve outlet, so that the bore 11 and choke point 12 are indirectly connected to the valve chamber 9 via the radial bore 14. In contrast, the other end of the bore 11 opens directly into the armature chamber 8, wherein an additional groove 10 provided in the armature 6 and an additional bore 11 facilitate pressure compensation within the armature chamber 8.

The hydraulic connection created by the choke point 12 and bore 11 between the valve chamber 9 and the armature chamber 8 increases the hydraulic volume available to compensate for pressure fluctuations or pressure waves. To this extent, pressure fluctuations or peaks introduced into the valve chamber via the low-pressure circuit connected on the outlet side can be compensated or at least damped so as to guarantee a higher functional reliability of the pressure regulating valve. The pressure compensation also takes place more quickly.

Figure 2A:
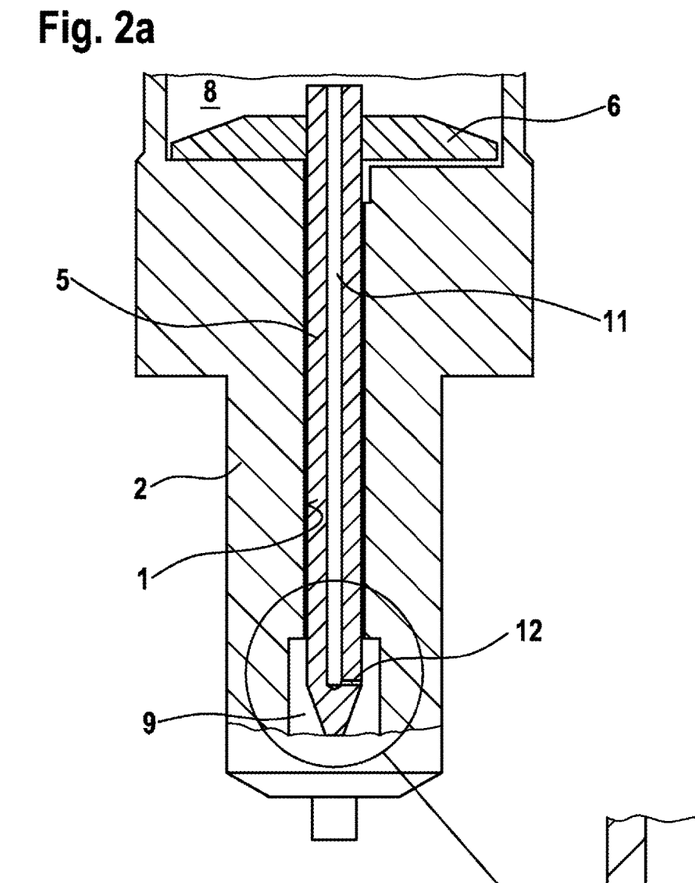
FIG. 2a a diagrammatic longitudinal section through a second preferred embodiment of a pressure regulating valve according to the invention.
Figure 2B:
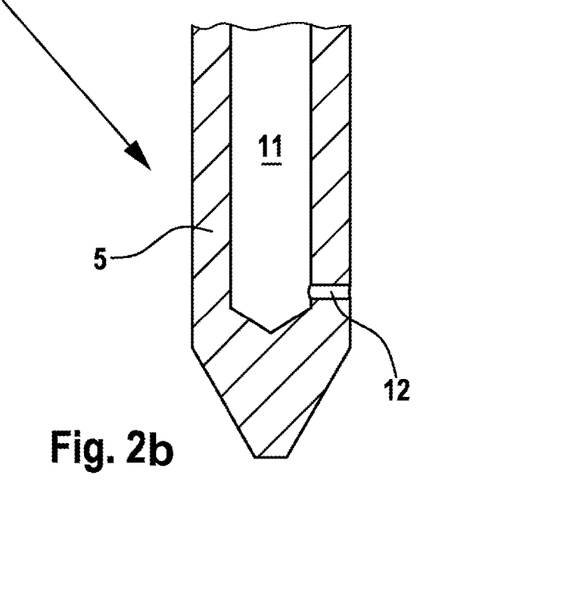

A second preferred embodiment is shown in FIG. 2a. The bore 11 and choke point 12 are here formed in the valve piston 5. The choke point 12 is designed as a transverse bore which connects the valve chamber 9 to the bore 11. Then via the choke point 12, the bore 11 opens directly into the valve chamber 9. A derivation of this embodiment is shown in FIG. 2b in which the choke point 12 is shown as a branch channel with a smaller cross section than the cross section of the bore 11.

Figure 3:
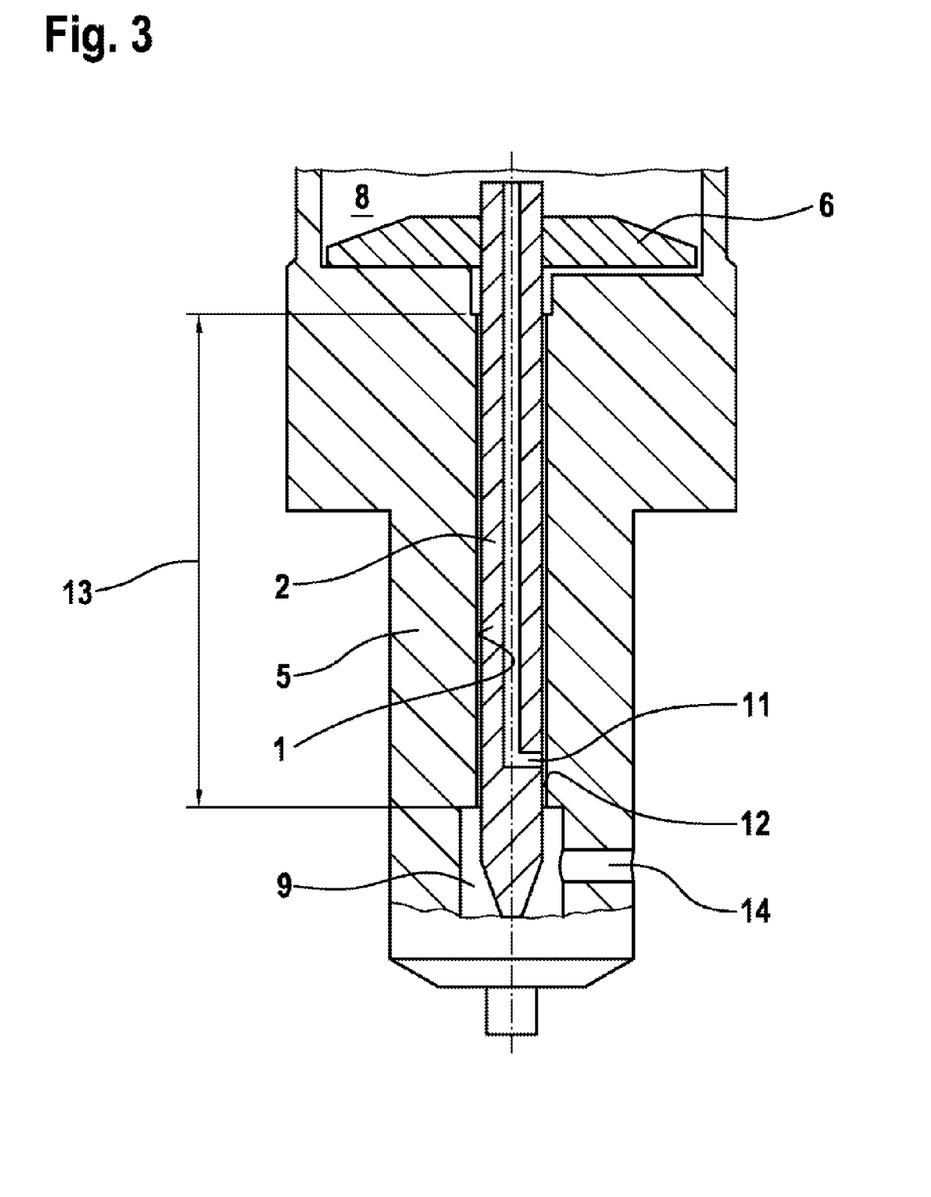
FIG. 3 a diagrammatic longitudinal section through a third preferred embodiment of a pressure regulating valve according to the invention.

A third preferred embodiment is shown in FIG. 3. The bore 11 is again formed in the valve piston 5 and opens into a transverse bore, wherein the bore 11 and the transverse bore have the same cross section. The transverse bore does not open directly into the valve chamber 9 but into a ring gap configured between the valve piston 5 and the valve housing 2 and serving as a guide portion 13. At least in the lower region i.e. in the region between the valve chamber 9 and the bore 11 or the transverse bore, the guide portion 13 therefore has a radial play which leads to the desired choke effect.

Figure 4:
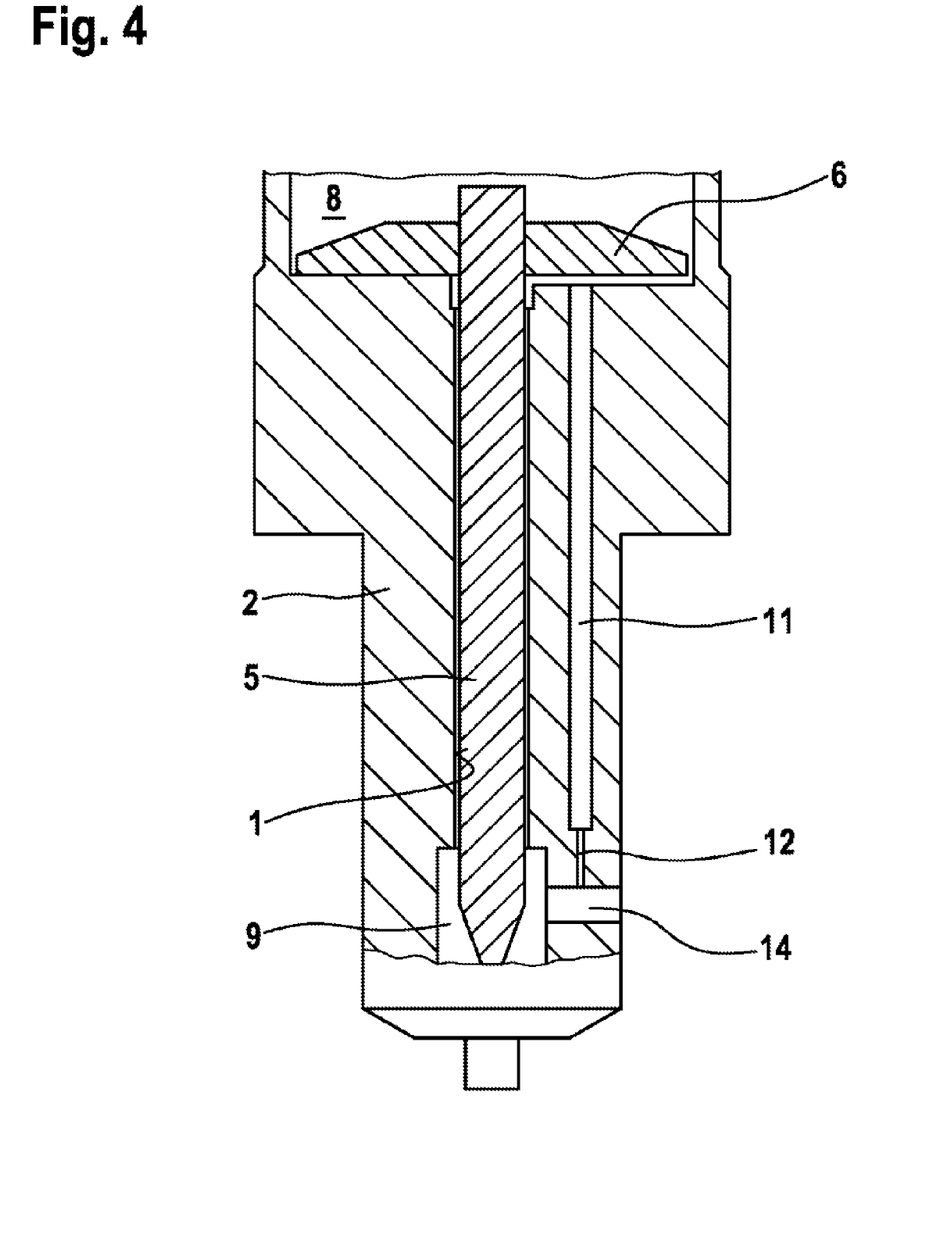
FIG. 4 a diagrammatic longitudinal section through a fourth preferred embodiment of a pressure regulating valve according to the invention.
Figure 5:
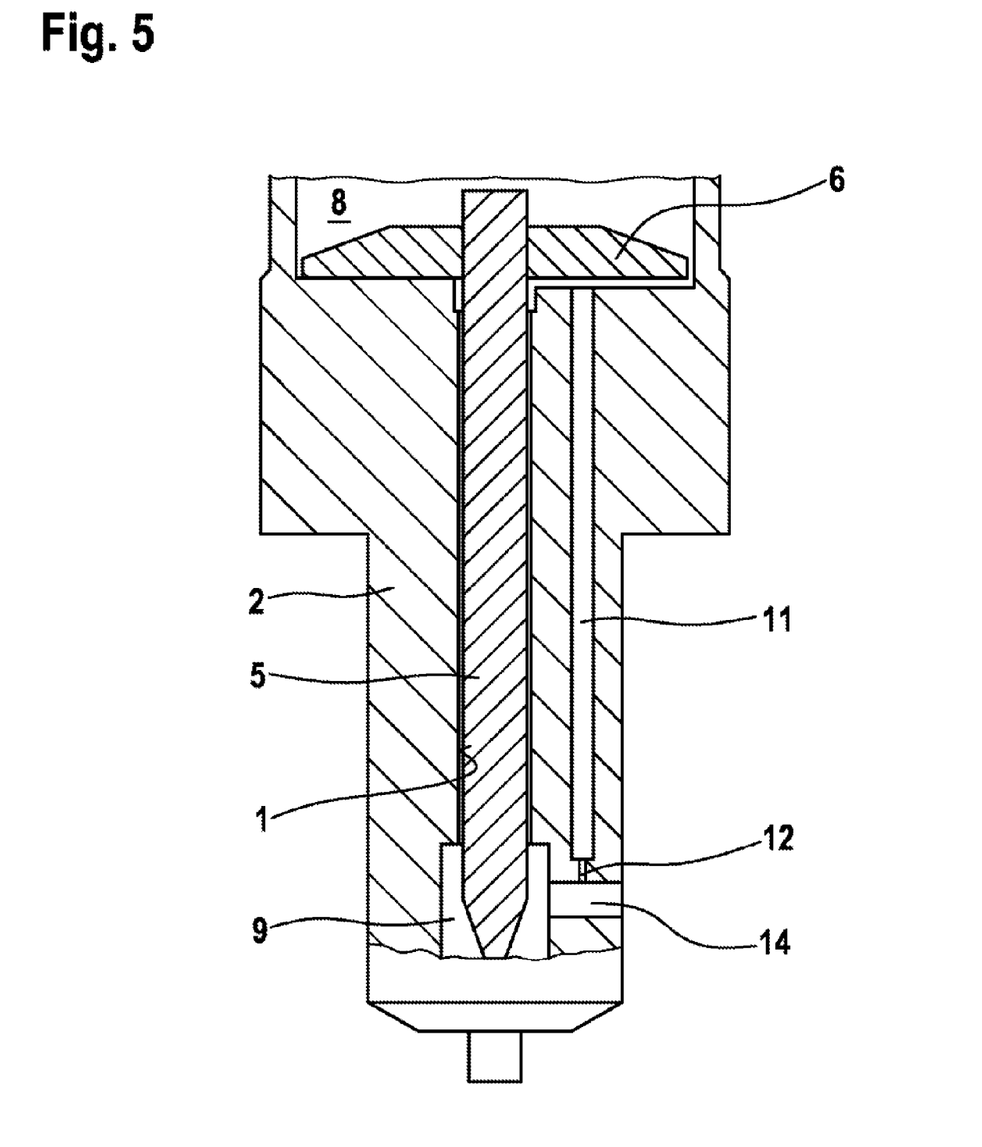
FIG. 5 a diagrammatic longitudinal section through a fifth preferred embodiment of a pressure regulating valve according to the invention.

FIGS. 4 and 5 show exemplary embodiments similar to that of FIG. 1. Whereas the example in FIG. 4 shows a bore 11 designed as a stepped bore to form the choke point 12, in FIG. 5 an example with a separately formed choke point is shown.

In the exemplary embodiment of FIG. 5, refining measures are shown which can be applied independently of the actual embodiment of the groove 10 and/or bore 11 and choke point 12. To this extent these measures can be implemented alone or cumulatively, also in the embodiments of FIGS. 1 to 4 already described.

Figure 6:
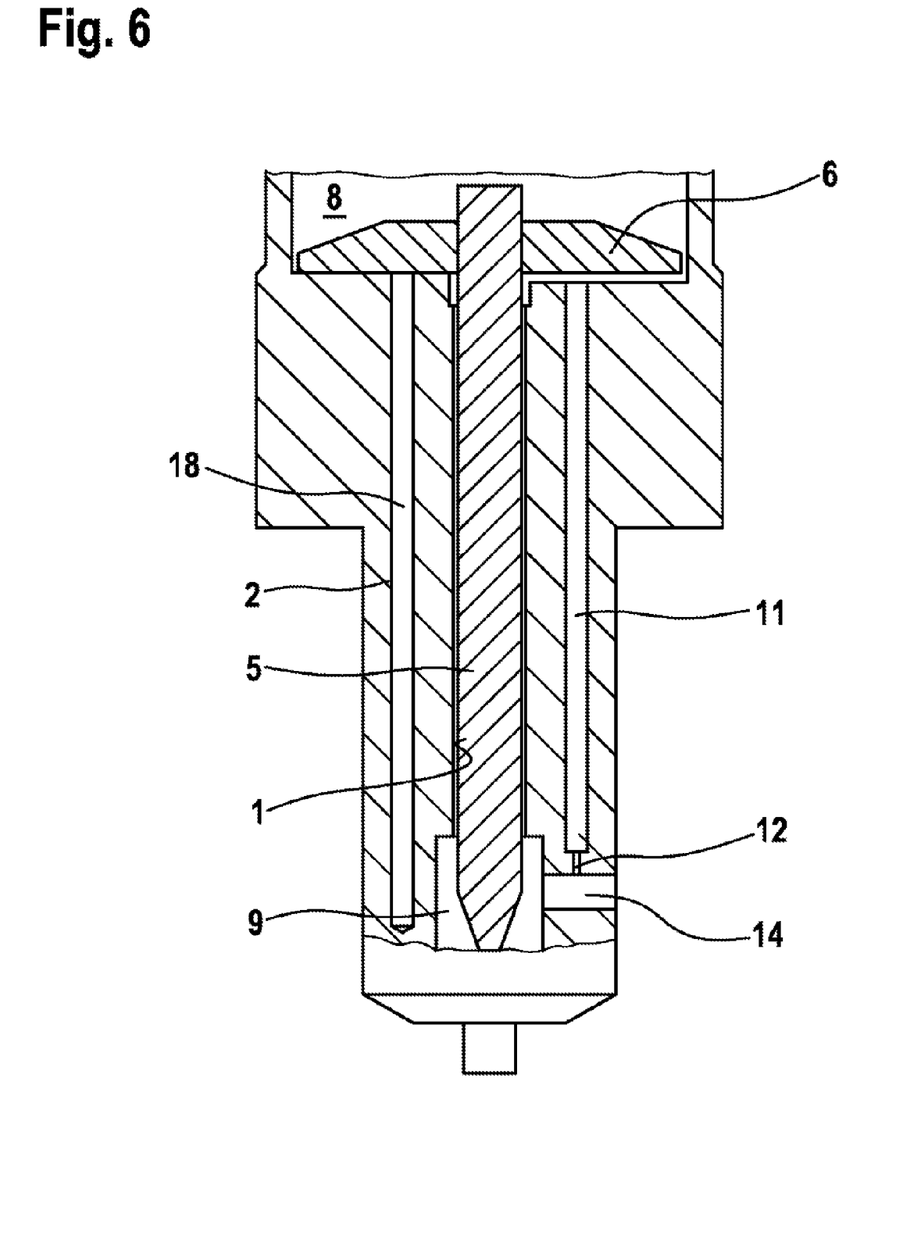
FIG. 6 a diagrammatic longitudinal section through a sixth preferred embodiment of a pressure regulating valve according to the invention.

A first additional refining measure is shown in FIG. 6. Here the valve housing 2 comprises, in addition to the bore 11, a further axial bore which however is designed as a blind bore and creates an additional hydraulic volume 18 into which the armature chamber 8 expands. The additional hydraulic volume 18 not only promotes the compensation or damping of pressure fluctuations, but also changes the resonant frequency of the pressure control valve in order to counter natural vibrations.

Figure 7:
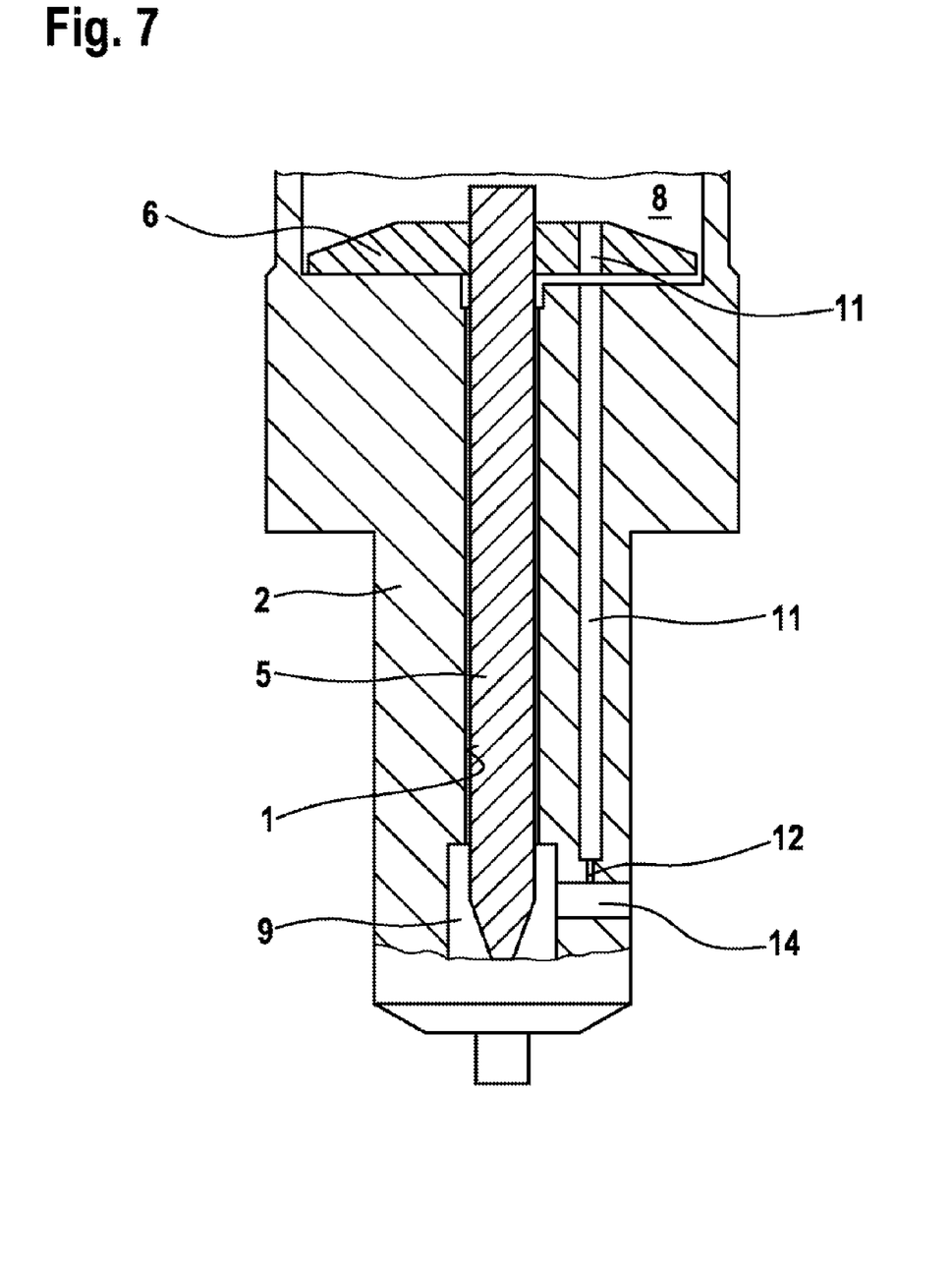
FIG. 7 a diagrammatic longitudinal section through a seventh preferred embodiment of a the pressure regulating valve according to the invention.

Alternatively or additionally to the refining measures shown in FIG. 6, a bore 11 can be provided in the armature 6, as shown in FIG. 7. The bore 11 can be arranged in the extension of a bore 11 in the valve housing 2 or offset to this. In the latter case, preferably furthermore a groove 10 is provided on the underside of the armature 6 which connects the two bores 11 (see FIG. 1).

Figure 8:
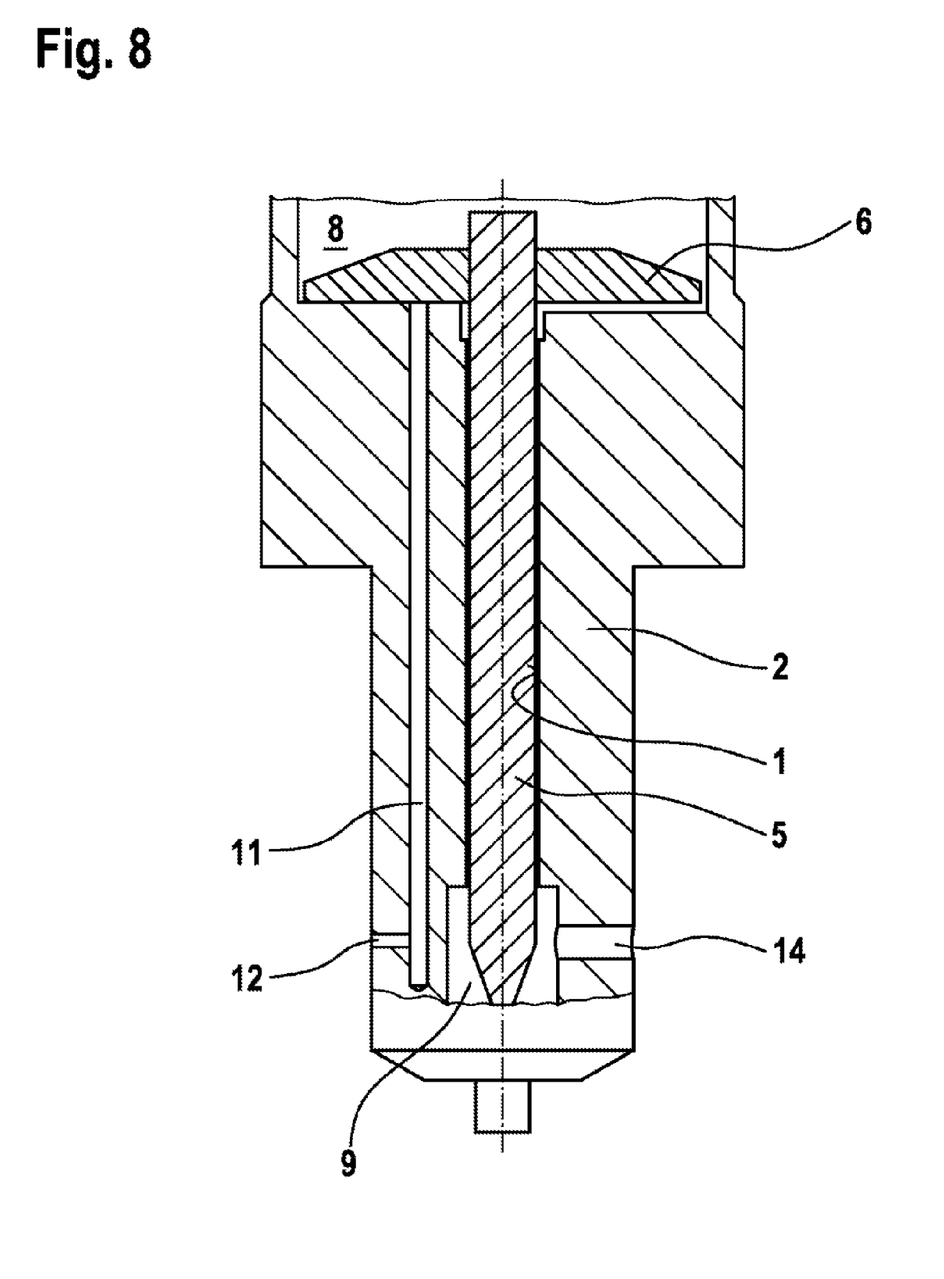
FIG. 8 a diagrammatic longitudinal section through an eighth preferred embodiment of a pressure regulating valve according to the invention.

It is furthermore advantageous if the connection of the valve chamber 9 to the low-pressure circuit is not made directly via the radial bore 14 but indirectly via the armature chamber 8. In the exemplary embodiment shown in FIG. 8, the valve chamber 9 is connected to the low-pressure circuit via the radial bore 14, the choke point 12, the bore 11 and the armature chamber 8. The significantly extended flow path counters the transmission of pressure fluctuations from the low-pressure circuit. Also the influence of the flow speed of the fuel flowing out via the radial bore 14 is reduced.

Figure 9:
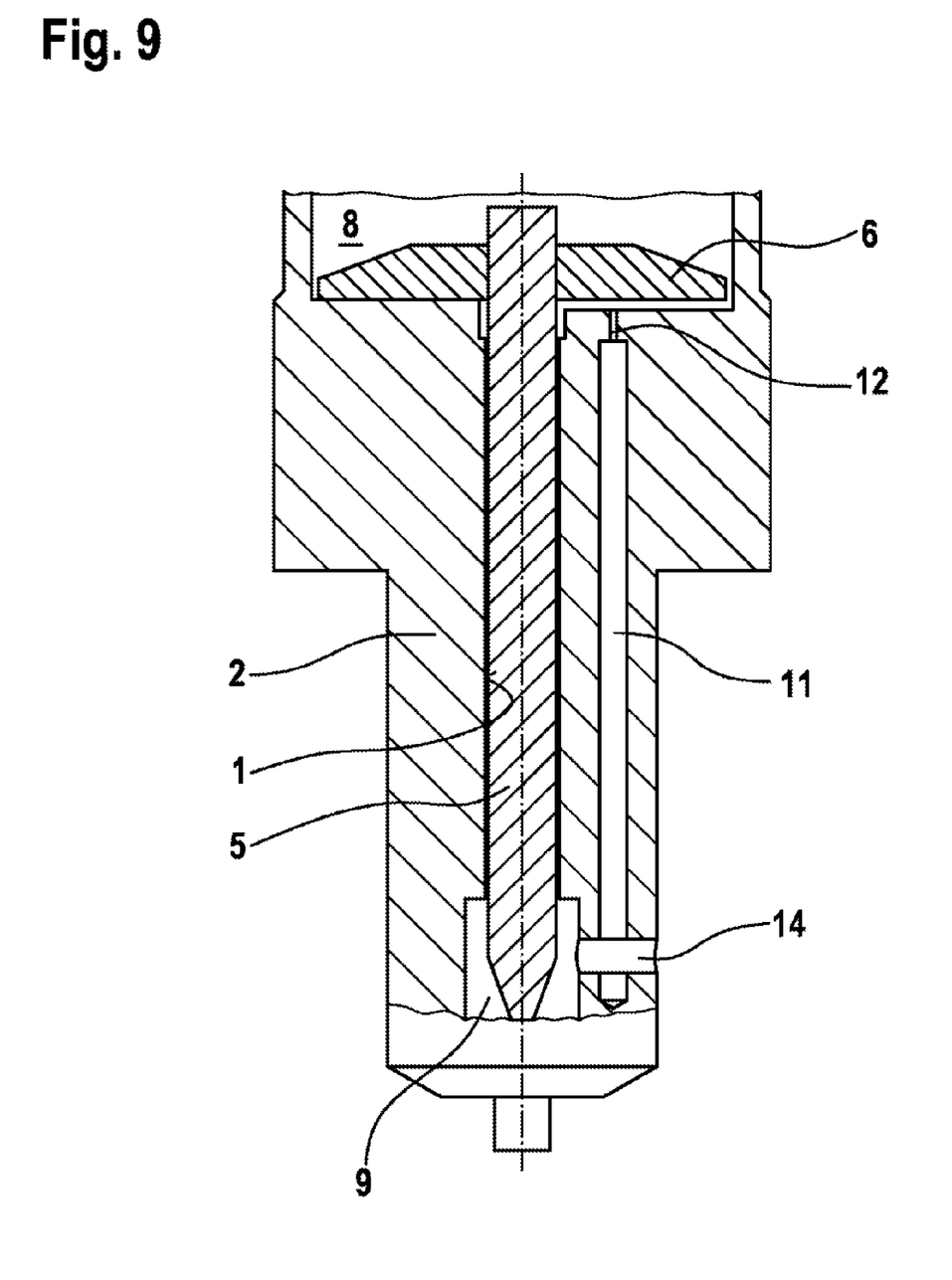
FIG. 9 a diagrammatic longitudinal section through a ninth preferred embodiment of a pressure regulating valve according to the invention.

A further preferred exemplary embodiment of the invention is shown in FIG. 9, which differs from the preceding example in that the choke point 12 is connected downstream of the bore 11. The bore 11 opens firstly via the choke point 12 into the armature chamber 8, and secondly via the radial bore 14 into the valve chamber 9. Here too, the refining measures shown in connection with FIGS. 6 to 8 can also be implemented.

Figure 10:
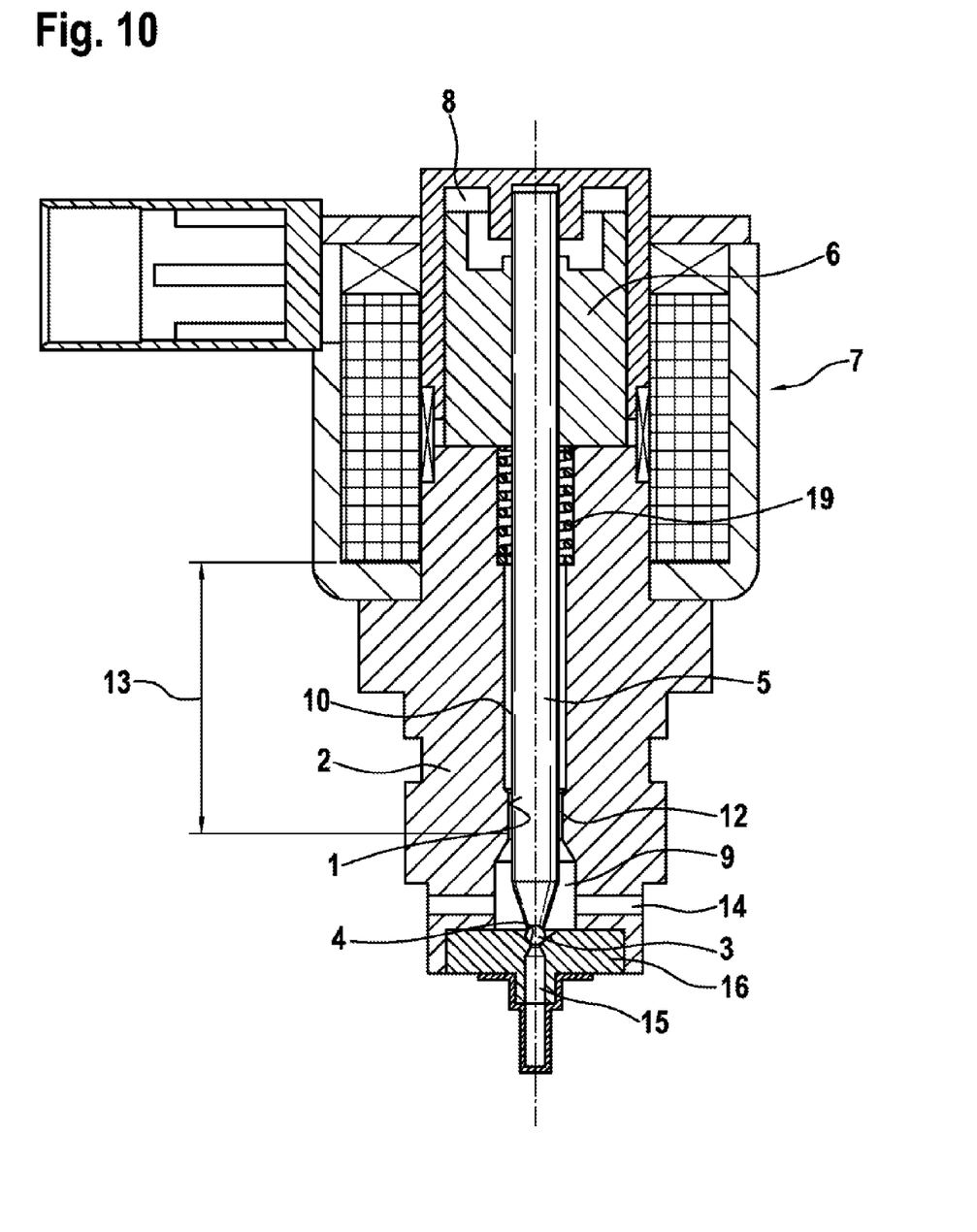
FIG. 10 a diagrammatic longitudinal section through a tenth preferred embodiment of a pressure regulating valve according to the invention.

Finally, FIG. 10 shows a further alternative embodiment. Here the armature 6 is formed as a solenoid plunger and is loaded in the opening direction by the spring force of the spring 19. The valve is therefore designed as a normally open valve. The hydraulic connection of the valve chamber 9 with the armature chamber 8 is in this case created via grooves 10 which are formed running axially in the wall of the bore 1 of the valve housing 2 at equidistant intervals. In a lower region of the bore 1—also serving as a guide portion 13—the grooves have a reduced cross section so that choke points 12 are formed which connect the grooves 10 to the valve chamber 9. For this exemplary embodiment too, the refining measures shown in FIGS. 6 to 8 can also be implemented.

It is pointed out that with the exception of FIGS. 1 and 10, the drawings are diagrammatic. For example, the valve housing is shown greatly simplified in that for example there is no depiction of the valve seat 4 and/or valve inlet 15, and/or no differentiated depiction of the valve piece 16. Nonetheless these are present. The same applies to the magnetic assembly 7 insofar as not shown or shown greatly simplified.

What is claimed is:

1. A pressure regulating valve for regulating pressure in a high-pressure fuel accumulator for an internal combustion engine, the pressure regulating valve comprising a valve piston (5) held axially displaceably in a bore (1) of a valve housing (2) and acting on a valve closing member (3) in a direction of a valve seat (4), said valve piston being connected, at an end facing away from the valve seat (4), to an armature (6) of a magnetic assembly (7) for actuating the pressure regulating valve, wherein the armature (6) is held in an armature chamber (8) and the valve closing member (3) is held in a valve chamber (9), and wherein the valve chamber (9) and the armature chamber (8) are hydraulically connected via at least one groove (10) and/or bore (11) formed in the valve housing (2), valve piston (5) and/or armature (6) and at least one choke point (12), wherein the at least one choke point (12) is formed in the groove (10) and/or bore (11), wherein the groove (10) and/or bore (11) is stepped so as to form the choke point (12), wherein the valve chamber (9) and/or the armature chamber (8) are always connected to a return, and wherein the valve chamber (9) is connected to the return only via the armature chamber (8).

2. The pressure regulating valve as claimed in claim 1, wherein the valve chamber (9) and the armature chamber (8) are always connected to the return.

3. The pressure regulating valve as claimed in claim 1, wherein the valve chamber (9) is always connected to the return.

4. The pressure regulating valve as claimed in claim 1, wherein the armature chamber (8) is always connected to the return.

5. The pressure regulating valve as claimed in claim 1, wherein the at least one choke point (12) is connected upstream of the groove (10) and/or bore (11).

6. The pressure regulating valve as claimed in claim 1, wherein an additional hydraulic volume (18) is provided in the form of a blind bore formed in the valve housing (2).

7. The pressure regulating valve as claimed in claim 6, wherein the pressure regulating valve is a normally closed or normally open valve, wherein a direction of action of a magnetic force of the magnetic coil (20) can be the same or opposite the direction of action of a spring force of a spring (190).

* * * * *